United States Patent
Bijor et al.

(10) Patent No.: US 10,271,176 B2
(45) Date of Patent: Apr. 23, 2019

(54) SYSTEM AND METHOD FOR CREATING AND MANAGING A USER SESSION AT A REMOTE TERMINAL COMPUTING SYSTEM

(71) Applicant: Uber Technologies, Inc., San Francisco, CA (US)

(72) Inventors: Rahul Bijor, San Francisco, CA (US); Billy Chen, San Francisco, CA (US)

(73) Assignee: Uber Technologies, Inc., San Francisco, CA (US)

( * ) Notice: Subject to any disclaimer, the term of this patent is extended or adjusted under 35 U.S.C. 154(b) by 0 days.

(21) Appl. No.: 15/663,597

(22) Filed: Jul. 28, 2017

(65) Prior Publication Data
US 2019/0037357 A1 Jan. 31, 2019

(51) Int. Cl.
| | |
|---|---|
| *H04W 4/12* | (2009.01) |
| *H04W 4/02* | (2018.01) |
| *H04L 29/08* | (2006.01) |
| *G08G 1/00* | (2006.01) |
| *H04M 1/725* | (2006.01) |
| *H04W 4/20* | (2018.01) |

(52) U.S. Cl.
CPC ............ *H04W 4/025* (2013.01); *G08G 1/202* (2013.01); *H04L 67/141* (2013.01); *H04L 67/18* (2013.01); *H04L 67/22* (2013.01); *H04L 67/306* (2013.01); *H04L 67/327* (2013.01); *H04M 1/72522* (2013.01); *H04W 4/20* (2013.01)

(58) Field of Classification Search
CPC ........ H04W 4/025; H04W 4/20; G08G 1/202; H04L 67/141; H04L 67/18; H04L 67/22; H04L 67/306; H04L 67/327; H04M 1/72522
See application file for complete search history.

(56) References Cited

U.S. PATENT DOCUMENTS

| | | | |
|---|---|---|---|
| 2014/0018046 A1* | 1/2014 | Grenier | H04W 4/12 455/413 |
| 2017/0293610 A1* | 10/2017 | Tran | G06F 17/2785 |

* cited by examiner

*Primary Examiner* — Pakee Fang
(74) *Attorney, Agent, or Firm* — Mahamedi IP Law LLP

(57) ABSTRACT

A network system for managing an on-demand service can receive, from a user, a service request indicating a destination location. In addition to facilitating available service providers to fulfill the service request, the network system can create and manage a session for the user for an entity identified based on, for example, the destination location. The session for the user can be used to procure items and/or services provided by the entity. The network system can transmit, to terminal computing system(s) associated with the entity, session initiation data that includes user data such as identification information to identify the user. The transmission of the session initiation data can cause the terminal computing system(s) to automatically create the session for the user. In addition, the network system can receive, from the terminal computing system(s), session data upon termination of the session for the user.

20 Claims, 6 Drawing Sheets

SYSTEM AND METHOD FOR CREATING AND MANAGING A USER SESSION AT A REMOTE TERMINAL COMPUTING SYSTEM

BACKGROUND

Standard computer systems deployed at entities such as restaurants, bars, merchants, and other vendors and businesses (e.g., point of sale terminals, etc.) allow operators to record and process transactions, such as orders for food or drinks, or purchases for items. Typically, a user can place an order, the operator can provide input on the computer system, and the user can pay the total amount using a payment of choice.

BRIEF DESCRIPTION OF THE DRAWINGS

The disclosure herein is illustrated by way of example, and not by way of limitation, in the figures of the accompanying drawings in which like reference numerals refer to similar elements, and in which.

DETAILED DESCRIPTION

Figure 1:
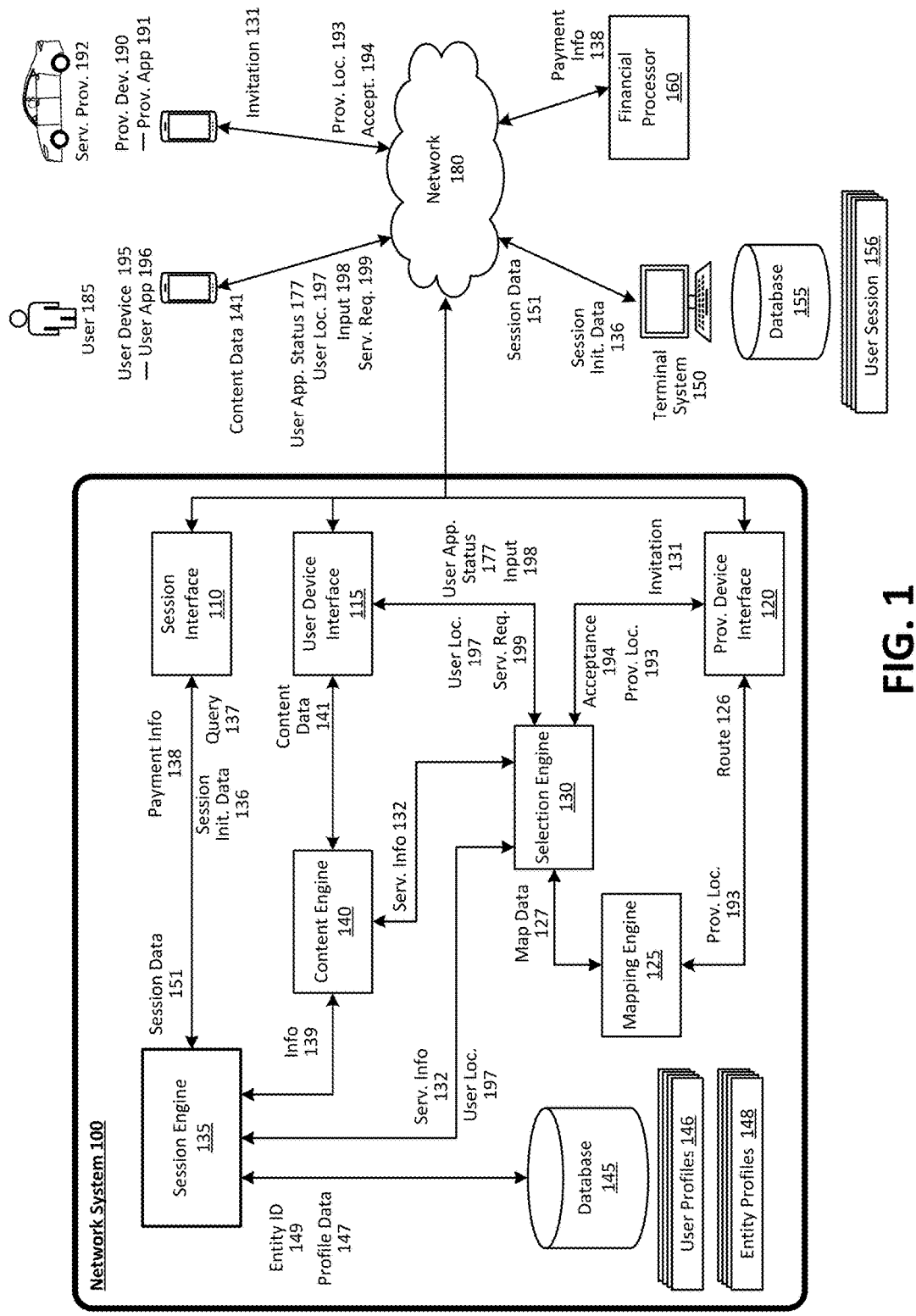
FIG. 1 is a block diagram illustrating an example network system in communication with user device and provider devices that is capable of creating a session at a remote computing system, in accordance with examples described herein.

Examples herein describe a network computing system ("network system") that utilizes user information and/or programmatically inferred contextual information associated with the user (e.g., user profile data, information pertaining to a service request, payment method or profile, etc.) to remotely trigger or initiate a session at various locations or entities for the user in order to enable the user to procure items or other services at those entities. Currently, point of sale terminals or computing devices require their human operators to manually input requests for items or services made by users, and to manually open and close a transaction by swiping using a card reader device or hardware (e.g., a credit card scanner or reader coupled to or in communication with the point of sale terminals). The network system described herein can provide additional functionality and improve the operations of a point of sale terminal remote from the network system, for example, by (i) programmatically determining or identifying an entity (ies) for a user, such as an entity that the user is traveling to or has plans to visit in the near future, even before the user arrives at the entity, (ii) identifying the point of sale terminal (s) for the entity, and (ii) transmitting data, over a network(s) to the remote point of sale terminal using, for example, application programming interfaces or software development kits integrated with the network system and/or the point of sale terminal(s) to trigger the point of sale terminal to automatically create a session (e.g., one or more transaction records, a transaction account, etc.) for use by the user at the entity using data stored at or accessible by the network system.

Examples provide a distributed and networked architecture and platform that improves efficiency and throughput over existing point of sale systems. In one aspect, this distributed and networked architecture and platform can determine the user's location or information relating to a requested service (e.g., a transport service to the entity associated the terminal computing system) to remotely cause the terminal computing system to dynamically and automatically initiate and/or terminate user sessions based, at least in part, on the user's location and/or the information relating to the requested on-demand service. For example, the distributed and networked architecture and platform enables the automatic creation of a session for a user at a remote system for use at an entity based on information indicating that the user is traveling to (or planning to travel to) the entity's location. It also enables the automatic termination of the session based on information indicating that the user is leaving the entity (e.g., by comparing location data associated with the user and the entity's location, or by receiving a service request by the user in traveling away from the entity's location, etc.). This aspect provides a technological improvement over existing point of sale systems at least because existing bottlenecks of the point of sale system processing (e.g., operator manually inputting information into the point of sale system) can be eliminated and hardware and software resources of existing point of sale system can be more efficiently utilized. It also reduced the chance of human operator error (e.g., in inputting data), thereby reducing the need for programmatic error-checking and verifications by the point of sale system (or other processing systems).

As described throughout, in contrast with conventional point of sale systems, various components of the distributed and networked architecture and platform provide programmatic interfaces to allow specialized real-time information to be shared among the components to enable the various functionalities and improvements described herein. For instance, the user computing devices (and service provider computing devices) provide programmatic interfaces to permit the network system to access a variety of real-time information generated by the user computing devices, including location information (e.g., GPS, GLONASS) or direction information (e.g., real-time compass heading), to enable the programmatic identification of entities and initiation of user sessions based on such information. For instance, the network system can continuously monitor the location information generated by the user computing device to identify an entity and its associated terminal computing system to which to transmit session initiation data.

The distributed and networked architecture and platform can utilize user location information and/or information relating to the requested service to dynamically alter a mode of operation of the user application and/or dynamically update one or more user interfaces of the user application. For instance, the user application can be triggered to dynamically enter into additional modes of operation to provide additional functionality such as displaying menu items available for request based on information generated by various components of the platform indicating that the user is about to arrive at the entity. In addition, one or more user interfaces of the user application can further be dynamically updated to display relevant information such as information relating to the entity and/or available items or services for request based on, for example, the user's ETA to the destination location or the entity location. These aspects of the user application and the platform enable the user to seamlessly request items and/or services offered by the entity before the user arrives at the entity. Information relating to the user's selection of items and/or services to request can be transmitted to the terminal computing system at the entity. This context-based capability and user experience (including the dynamic user interfaces discussed herein) represent another technology-based improvement over conventional point of sale systems.

Still further, the distributed and networked architecture and platform enables the user to procure items and/or services without the need to separately provide a payment method or information at the entity. This can increase the security of the user's experience—for instance, the user need not exchange sensitive financial information (e.g., credit cards, debit cards) with operators at entities. Furthermore, the network system described herein enables the user to request services and order items at entities using a single application (or two or more tightly-integrated applications) executing on the user device, thereby improving the user experience.

The network computing system can manage a network service for linking service providers (e.g., drivers, couriers, autonomous vehicles (AVs), etc.) with users requesting service (e.g., a transport service, a delivery service, etc.) in a given geographic region (e.g., a city, a metroplex such as the San Francisco Bay Area, etc.). The network system can manage a set or pool of service providers over the given geographic region, each operating a computing device ("provider devices"). In doing so, the network system can receive service requests from users via a designated user application executing on the users' mobile computing devices ("user devices"). In response to receiving a request, the network system can identify a service provider from a set of candidate service providers and transmit a notification message (e.g., invitation or invitation notification) to the provider device of the identified or selected service provider to invite that service provider to provide or fulfill the service request. Upon receiving the invitation notification, the provider device can display information relating to the service request and the service provider can choose to accept or reject the service via a designated provider application executing on the provider device. The provider device transmits the response to the network system.

In various aspects, the service request can indicate a start location (e.g., a pickup location), such as a location at which the service provider is to rendezvous with the requesting user, and an end or destination location (e.g., a location at which the requesting user is dropped off by the service provider). The start and/or destination locations can be inputted or selected from a list by the requesting user, for example, as addresses, as names of entities (e.g., restaurants, bars, vendors, merchants, retailers, venues, other establishments, etc.), or as cross streets. In addition, in another example, the requesting user can interact with a map interface provided within the user application to set the start and/or destination locations using a graphic feature. Furthermore, the start location can be determined programmatically by the user device based on real-time location data generated by the user device (e.g., by a GPS subsystem of the user device). In this manner, the user's current location can be automatically set as the start location. Additionally, in one example, the service request can indicate a desired time at which the requested service is to be initiated or completed.

Examples described herein provide for the network system to utilize available information (e.g., user profile data, information pertaining to a service request, payment method or profile, etc.) in enabling a user of the network service to seamlessly open or initiate a session at various entities, such as bars or restaurants, to procure items or other services at those entities. As described herein, a "session" can include a set of records indicating items or services provided by one or more entities for the user, can correspond to a temporary account for use by the user to procure items or services at the one or more entities, or can correspond to a "tab" of the user for use at one or more entities. Also as described herein, an entity can be associated with an entity profile (including an entity identifier) that is stored in a database accessible by the network system. The entity profile can include information about one or more remote computing systems ("terminal system") that are controlled by operators of the entity. According to one example, the network system can identify an entity based on information associated with the service request (or the resulting service provided by a service provider) and/or user profile data (e.g., user preferences, historical session data, etc.). Such an entity can be a location that the user is traveling to or has plans to visit in the near future (e.g., within the next hour or few hours, or later in the day, etc.). The network system can periodically or continuously monitor information related to the user's request to update entity(ies) identified for the user in the event the destination location of the user's service request is modified (e.g., by the user via the user application executing on the user device). For instance, in the event that the user modifies the destination location while the service is being rendered by the service provider, the network system can readily update the identified entity(ies) to match the modified destination location. The network system can identify the terminal system(s) for the entity using the entity's identifier, and transmit a set of data (e.g., session initiation data), including user data corresponding to the user, to the terminal system at the entity's location. In response to receiving the set of data from the network system, the terminal system can automatically create a session (e.g., one or more transaction records, a transaction account, etc.) for use by the user at the entity.

According to an example, the user data can include an identifier of the user, the user's name, and/or a photograph of the user. Furthermore, the network system can programmatically determine when to terminate the session for the user and query the terminal system for the session data (e.g., transaction data, such as data for the items or services procured by the user, data for the quantity of such items or services, data for the cost paid, timestamp data, etc.). In one example, the network system can remotely cause the terminal system to terminate the session for the user by, for example, transmitting a query for the session data to the terminal system. In another example, an operator of the terminal system can also terminate the session for the user which can cause the terminal system to transmit the session data to the network system. The network system can process, or facilitate the processing of, one or more payments on behalf of the user and/or the one or more entities based on the received session data. As an addition or an alternative, the network system can present to the user, via a graphical user interface, recommendations or promotions for specific entities near the destination location that are highly relevant to the user based on the user's service request, historical user data, or other available information.

As used herein, a terminal system can be one or more point of sale terminals, servers, mobile computing devices (e.g., smartphones, tablet computers), or computer systems for use at an entity for inputting and/or processing in-person or remote transactions. The term "a terminal system" or "the terminal system" is not in any way intended to be restricted to single device or computer system. For instance, a terminal system can refer to a plurality of point of sale terminals networked with one another to function together.

As described above, the network system can identify an entity for a user. According to embodiments, the entity can be identified based on data from the service request and/or on information related to a service facilitated or arranged by the network system (e.g., in managing the user's requests for services). In certain examples, the user can input or select an entity (e.g., by name or address) as the destination location in requesting an on-demand service. The network system can determine an identifier of the entity ("entity identifier") by querying a database of entities or entity profiles for the name and/or address specified by the user. The database of entities can be maintained by the network system or can be a third-party database (e.g., a database maintained by a third-party mapping service, etc.) accessible by the network system. In another example, the network system can identify an entity based on its location in relation to the destination location indicated in the user's service request. As one example, a set of entities within a predetermined distance from the destination location can be identified by the network system. Still further, depending on implementation, the network system can receive a selection of one of a set of entities from the user (upon presenting the set of entities as part of a graphical user interface on the user device), or select an entity from the set of entities based on historical data of the user (and/or other users) or other data (e.g., ranking information, ratings information, etc.). In addition, the entity can also be identified based on an estimated time of arrival at the destination location. For instance, the network system can filter, from consideration, entities that are closed when the user is estimated to arrive at the destination location.

In certain implementations, the network system can further identify the entity based on user profile data, such as user preferences or past activity of the user. For instance, if the user profile data indicates that the user has preferences for a certain cuisine type, the network system can identify restaurants that match those preferences. The network system can also identify entities that the user has previously patronized or visited. If the network system identifies a set if entities based on the user profile data, the network system can present on the set of entities as part of the user interface on the user device, and prompt for and receive user input regarding the entity(ies) user intends to visit. For example, the network system can transmit, to the user device, content data to cause the user device to display a notification or a prompt for the user to enter an input regarding the entity(ies) the user intends to visit (e.g., after a service is arranged by the network system in response to a service request from the user). The notification or prompt can enable the user to select an entity among the set of suitable entities that programmatically identified by the network system based on user profile data and other information. In response to the user input, the network system can transmit a set of data (e.g., session initiation data), including user identification data, to a terminal system associated with the entity(ies) selected by the user to cause the terminal system to create or initiate a session for the user for use at the selected entity(ies). In some examples, the network system can transmit session initiation data to multiple entities. For instance, the user may indicate that he or she intends to visit multiple entities after arriving at the destination location.

According to embodiments, upon identifying the entity, the network system can transmit the session initiation data to the terminal system at the entity identified by the network system to seamlessly open one or more sessions for the user for use for requesting items and/or services provided by the entity. The session initiation data can include user data such as identification information for the user. Identification information can include, for example, the user's name (or a nickname), a photograph of the user, a unique graphical avatar, or other means of identifying the user. In response to receiving the session initiation data, the terminal system can automatically create a session (e.g., a tab) for the user for use at the entity for the duration of the user's visit to the entity. The session can include the identification information included in the user data. Using the identification information, an operator of the terminal system (e.g., a cashier, a bartender, a waiter or waitress, a server, etc.) at the entity can identify the user and allow the user to request items or services under the session created for the user. For instance, the user can give his or her name to the operator to identify the user, allow the operator to identify the corresponding session for the user (e.g., by querying, on the terminal system, for the identification information), and can request items or services provided by the entity under the user's session.

In one example, the network system can transmit content data to the user device to enable the user to request items or services provided by the entity prior to the user's arrival at the entity. The network system can determine to transmit such content data at appropriate times based on, for example, information associated with the service request to the destination location. In this manner, the user can request items and/or services provided by the entity prior to the user's arrival at the destination location (e.g., while the user is traveling to the entity's location via the requested on-demand service). For instance, the network system can determine, based on location data transmitted by the user device and/or the provider device, and/or the user's location or the user's route of travel that the user is estimated to arrive at the destination location (and the entity's location) within the next fifteen minutes. Based on this determination, the network system can transmit, to the user device, content data to cause the user device to display a menu of items and/or services offered by the entity to enable the user to submit a request or order for items or services just prior to arriving at the entity.

Once the user completes his or her visit to the entity, session data can be transmitted from the terminal computer system(s) at the entity to the network system. According to embodiments, the network system can detect the occurrence of account-termination events indicating that the user has completed his or her visit to the entity and, in response, can query the terminal system at the entity for the session data. Detecting account-termination events can include, for example, detecting that the user has departed the entity based on real-time location data received from the user device, receiving another service request from the user requesting service away from the entity location to another location, or determining that the session for the user has timed out (e.g., after a predetermined duration of time). Upon receipt of the query from the network system, the terminal system can automatically terminate the session for the user and transmit session data corresponding to the user's orders to the network system. In another example, the session for the user can also be terminated by the operator of the terminal system at the entity by interacting with the operator interface provided on the terminal system.

According to embodiments, the session data can include an itemized accounting of items and/or services provided by the entity for the user during the user session. As an addition or an alternative, the session data can indicate a monetary amount corresponding to the sum of items and/or services purchased by the user. The session data can be encrypted by the terminal system before being transmitted to the network system. In response to receiving the session data, the network system can process, or facilitate in processing, one or more payments on behalf of the user and/or the entity for the items and/or services procured by the user. In some examples, the network system can process the one or more payments using payment information stored with/in the user's profile associated with the network service. The network system can cause a payment to be charged to a payment method stored in the user's profile and disburse the payment (or a portion thereof) to the entity in the process. In other examples, the network system can transmit encrypted payment information to a third-party financial processor (e.g., a payment processor) to process the payment.

In certain implementations, the network system may include a recommendation component for generating recommendations and promotions (collectively referred to herein as "recommendations" for purposes of simplicity) that can be specifically tailored to the user and/or to a service arranged by the network system in response to a service request from the user. In one aspect, the network system can transmit content data to enable the user device to display recommendations of popular items available at the entity upon the initiation or creation of the user's session. In another aspect, the network system can transmit content data to enable the user device to display a recommendation regarding an entity for the user to visit.

In one implementation, the user can initiate the seamless session experience without submitting a service request. Instead, the user can, via a user application executing on the user device, select a specific entity (e.g., a favorite entity, an entity within a specified distance from the user's current location, etc.). In response, session initiation data including user data such as identification information (e.g., the user's name etc.) can be transmitted to the terminal system of the specific entity to initiate a user session. The user can identify himself or herself to an operator at the specific entity using the identification information to procure items and/or services at the specific entity. In addition, the user can further interact with the user application to procure items and/or services.

As used herein, a computing device refers to devices corresponding to desktop computers, cellular devices or smartphones, personal digital assistants (PDAs), laptop computers, virtual reality (VR) or augmented reality (AR) headsets, tablet devices, television (IP Television), etc., that can provide network connectivity and processing resources for communicating with the system over a network. A computing device can also correspond to custom hardware, in-vehicle devices, or on-board computers, etc. The computing device can also operate a designated application configured to communicate with the network system or network service.

One or more examples described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more examples described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some examples described herein can generally require the use of computing devices, including processing and memory resources. For example, one or more examples described herein may be implemented, in whole or in part, on computing devices such as servers, desktop computers, cellular or smartphones, personal digital assistants (e.g., PDAs), laptop computers, VR or AR devices, printers, digital picture frames, network equipment (e.g., routers) and tablet devices. Memory, processing, and network resources may all be used in connection with the establishment, use, or performance of any example described herein (including with the performance of any method or with the implementation of any system).

Furthermore, one or more examples described herein may be implemented through the use of instructions that are executable by one or more processors. These instructions may be carried on a computer-readable medium. Machines shown or described with figures below provide examples of processing resources and computer-readable mediums on which instructions for implementing examples disclosed herein can be carried and/or executed. In particular, the numerous machines shown with examples of the invention include processors and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer-programs, or a computer usable carrier medium capable of carrying such a program.

System Descriptions

FIG. 1 is a block diagram illustrating an example network system in communication with user device and provider devices that is capable of creating a session at a remote computing system, in accordance with examples described herein. The network system 100 can manage an on-demand service that connects requesting users 185 with service providers 192 that are available to fulfill the users' service requests 199. The network system can provide a platform that enables on-demand services to be provided by an available service provider 192 for a requesting user 185 by way of a user application 196 executing on the user devices 195, and a service provider application 191 executing on the provider devices 190. As used herein, a user device 195 and a provider device 190 can comprise a computing device with functionality to execute a designated application corresponding to the on-demand service managed by the network system 100. In many examples, the user device 195 and the provider device 190 can comprise mobile computing devices, such as smartphones, tablet computers, VR or AR headsets, on-board computing systems of vehicles, smart watches, and the like.

The network system 100 can include a user device interface 115 to communicate with user devices 195 over one or more networks 180 via a user application 196. According to examples, a requesting user 185 wishing to utilize the service can launch the user application 196 and transmit a service request 199 over the network 180 to the network system 100. In certain implementations, the requesting user 185 can view multiple different service types managed by the network system 100. In the context of an on-demand transport service, service types can include a ride-share service, an economy service, a luxury service, a professional service provider service (e.g., where the service provider is certified), a self-driving vehicle service, and the like. The network system 100 can utilize the service provider locations 193 to provide the user devices 195 with ETA data of proximate service providers for each respective service type. For instance, the user application 196 can enable the user 185 to scroll through each service type. In response to a soft selection of a particular service type, the network system 100 can provide ETA data on a user interface of the user app 196 that indicates an ETA of the closest service provider for the service type, and/or the locations of all proximate available service providers for that service type. As the user scrolls through each service type, the user interface can update to show visual representations of service providers for that service type on a map centered around the user 185 or a start location set by the user. The user can interact with the user interface of the user application 196 to select a particular service type, and transmit a service request 199.

In certain implementations, the user device interface 115 can receive user input 198 and a user application status 177 from the user device 195 over the network 180. User interactions with the user application 196, including with any content displayed therein, can be transmitted as user input 198. Such input can include selections, text inputs, swipes, gestures, uploads, and the like. User application status 177 can correspond to signals or data indicating a status of the user application 196. For instance, when the user 185 first opens the user application 196, the user application 196 can cause the user device 195 to transmit a synchronization signal as the user application status 177 indicating that the user application is open.

In some examples, the service request 199 can include a start location at which a matched service provider 192 is to rendezvous with the requesting user 185. The start location can be inputted by the user as an address or by setting a location pin on a map interface of the user application 196, or it can be determined by a current location of the requesting user 185 (e.g., utilizing location-based resources of the user device 195). Additionally, the requesting user 185 can further input a destination location, which can be the location at which the matched service provider 192 is drop-off the requesting user 185. The destination location can be entered as an address, as an entity name, as a cross street, or via input on an interactive map displayed within the user application 196.

In various implementations, the network system 100 can further include a selection engine 130 to process the service requests 199 in order to identify one or more service providers 192 to service the service request 199. The network system 100 can include a provider device interface 120 to communicate with the provider devices 190 via the service provider application 191. In accordance with various examples, the provider devices 190 can transmit real-time location information using geo-aware resources of the provider devices 190 (e.g., GPS, GLONASS, etc.). These service provider locations 193 can be utilized by the selection engine 130 to identify a set of candidate service providers 192 that can fulfill the service request 199. The set of candidate service providers 192 can be identified based on an ETA to the service location, a service type, a provider type (e.g., luxury service provider, economy service provider), etc. In certain implementations, the network system 100 can also identify an autonomous vehicle (AV) to service the service request 199. Thus, the pool of proximate candidate service providers in relation to a start location can also include one or more AVs operating throughout the given region.

Once one or more candidate service providers 192 are identified by the selection engine 130, the selection engine 130 can generate invitations 131 to each of the one or more candidate service providers 192. Upon receiving the invitations 131, the one or more candidate service providers 192 can accept or decline the invitations 132 via the service provider application 191. Upon receiving acceptances 194 from the provider devices 190, the selection engine 130 can select one of the candidate service providers 192 who submitted an acceptance 194 to fulfill the service request 199.

In some aspects, the network system 100 can include a mapping engine 125, or can utilize a third-party mapping service, to generate map data 127 and or traffic data in the environment surrounding the start location. The mapping engine 125 can receive the service provider locations 193 and input them onto the map data 127. The map data 127 can be utilized by the selection engine 130 to identify the one or more candidate service providers 192 that are located near the start location. In addition, the mapping engine 130 can generate a route 126, including turn-by-turn directions, for transmission to the service provider 192 selected to fulfill the service request 199. The route 126 can include route segments from the current location of the service provider 192 to the start location, from the start location to the service location, etc. The route 126 can further include route guidance to intermediary stops for other service requests (e.g., intermediate stop to pick-up or drop-off another ride sharing passenger).

In some examples, the network system 100 can include a database 145 for storing information to enable the network system 100 to arrange on-demand services in response to user requests 199 and to initiate the seamless session experience for the user 185. The database 145 can store user profiles 146 which can be used for both the on-demand services (e.g., a transport service) and the seamless session process. The database 145 can store a user profile 146 for each user 185 of the on-demand service. The user profiles 146 can include user preferences regarding aspects of the on-demand services and the seamless session process inputted or specified by the user 185. For instance, the user profile 146 corresponding to the user 185 can indicate the user's favorite destination locations (e.g., home, work, gym, school, etc.), favorite entities (e.g., specific entities, genres of entities, etc.). In addition, the user profiles 146 can include past usage patterns or past activity history of the user 185 with respect to both the on-demand service and the seamless session process. For instance, the user profile 146 can store data regarding past service requests submitted by the user 185, entities visited in the past by the user 185, items or services procured by the user 185 using the seamless session process, etc. In addition, the user profile 146 can store payment information of the user 185 such as credit/debit card information, billing address, bank account information etc. The payment information can be used in the provision of on-demand services as well as in the seamless session process. In addition, the database 146 can store an entity profile 148 for each entity that supports the sessions opened by the network system 100. The entity profile 148 can include information regarding the entity using which the entity can be queried or identified including, for example, the name, address, genre, etc. of the entity.

In some examples, the network system 100 can include a content engine 140 for generating content data 141 for transmission to the user device 195 via the user interface 115 and the network 180. The generated content data 141 can rendered for display on the user device 195 as content within the user application 196 for requesting and managing the on-demand service and for facilitating the seamless session process. In certain examples in which the seamless session process is facilitated and managed by a second user application (not shown on FIG. 1) executing on the user device 195, the generated content data 141 can also be rendered for display on the user device 195 as content within the second user application. The content engine 140 can generate the content data 141 based on service information 132 received from the selection engine 130. For instance, the content data 141 transmitted to the user device 195 can cause the user device 195 to display information pertaining to the service facilitated by the network system 100 in response to the service request 199, including an estimated time of arrival at the destination location, a map display of the route and current progress, etc.

According to embodiments, the network system 100 can include a session engine 135 for managing one or more sessions for the user 185. To do so, the session engine 135 can receive service information 132. The service information 132 can be generated by the selection engine 130 and can indicate information such as the destination location indicated by the user 185, an estimated time of arrival at the destination location, etc. Based on the service information 132, the session engine 135 can determine an entity identifier 149 corresponding to an entity to which to transmit session initiation data 136 to initiate the seamless session experience for the user 185. For instance, the session engine 135 can determine an entity identifier 149 based on the location of the corresponding entity in relation to the destination location. In some examples, the destination location is entered as an entity name or an address. In response to receiving the service information 132, the session engine 135 can query the database 145 for an entity identifier whose corresponding entity's location matches the destination location by name or address. In certain examples, the entity identifier 149 can be further determined based on user preferences indicated in the user profile 146, received by the session engine 135 as user profile data 147. For instance, the session engine 135 can determine an entity identifier 149 whose corresponding entity is within a certain distance of the destination location and matches user preferences regarding a genre or category (e.g., a particular type of cuisine for restaurants, etc.). In addition, the session engine 135 can identify an entity within a certain distance of the destination location based on user profile data 149 indicating that the user 185 frequently visits the entity.

In an example, after determining the entity identifier 149, the session engine 135 can transmit, via session interface 110 over network 180, session initiation data 136 to a terminal system 150 at the identified entity. The session initiation data 136 can cause the terminal system 150 to automatically create a user session 156 for the user 185 for procuring items and/or services provided by the entity. The terminal system 150 can create the user session 156 for the user 185 based on session initiation data 136 received from the network system 100. The session interface 110 can encrypt the session initiation data 136 and other data transmitted over network 180. The session initiation data 136 can include identification information for the user 185 such as the user's name or nickname, a photograph of the user 185, a unique graphic avatar for identifying the user 185, etc.

After the creation of the user session 156 for the user 185, the user 185 can procure items or services seamlessly using the user session 156. For instance, the user can interact with the user application 196 (or a second user application having integration with the user application 196) to procure items and/or services provided the entity. In addition, the user 185 can interact with an operator of the terminal system 150 to request items or services. The operator of the terminal system 150 can input, via an operator interface, records of requested items and/or services into the user's user session 156.

According to one implementation, information 139 can be generated by the session engine 135 to cause the content engine 140 to generate content data 141 relating to the initialization or management of the user session 156. For instance, the content engine 140 can generate content data 141 based on the information 139 to cause the user device 195 to display content that allows the user 185 to select a specific entity (e.g., as identified by entity identifier 149) to visit among a plurality of suggested entities. In response, the session engine 135 engine can generate session initiation data 136 for transmission to terminal system 150 associated with the specific entity. In addition, based on the content data 141, the user device 195 can display content to allow the user 185 to submit a request for items and/or services to the entities. The request for item and/or services can be transmitted from the user device 195 to the terminal system 150 via the network system 100. In other examples, the network system 100 can enable the request to be transmitted directly from the user device 195 to the terminal system 150. In one implementation, the network system 100 can determine, based on service information 132, to transmit content data 141 to enable the user device 195 to display content to enable the user 185 to submit the request. In this manner, the user device 195 can display content to enable the user 185 to request items or services from the entity when the user 185 is traveling to or within a certain distance or time away from the entity, for example.

In the examples described herein, the network system 100 can determine, based on, for example, service information 132 or user location 197, to transmit a query 137 for session data to cause the terminal system 150 to terminate the user session 156. In this manner, the network system 100 can determine to cause the user session 156 to be closed by the terminal system 150 based on location data 197 indicating that the user 185 is leaving or has left the entity. Additionally, the network system can determine to cause the user session 156 to be closed by the terminal system 150 based on a service request 199 from the user 185 requesting on-demand services away from the entity location. Furthermore, the network system 100 can submit the query 137 for session data based on the expiration of a timer associated with the user session 156. In response to the query 137, the terminal system 150 can transmit session data 151 to the network system 100 in addition to closing the user session 156. Still further, the operator of the terminal system 150 can also close the user session 156 using the operator interface provided by the terminal system 150, which can transmit the session data 151 to the network system. The session data 151 can be encrypted before being transmitted by the terminal system 150.

According to embodiments, the network system 100, in response to receiving the session data 151, can process or facilitate in processing a payment on-behalf of the user 185 for items and/or services provided by the entity for the user 185. The session data 151 can include an itemized accounting of the items and/or services procured by the user 185. In some examples, the session engine 135 can directly process the payment on behalf of the user 185 using payment information in the user's profile data 147. In other examples, the session engine 135 can transmit payment information 138 to a third-party financial processor 160 to allow the third-party financial processor 160 to process the payment. Still further, the network system 100 can determine to directly process the payment or to transmit the payment information 138 to the third-party financial processor 160 based on the identity of the entity visited by the user 185. For certain entities, the network system 100 can determine based on data associated with the entity identifier 149 to directly process the payment. For example, based on the entity identifier 149, the network system 100 can retrieve information from database 145 indicating that the entity corresponding to the entity identifier 149 has completed the appropriate steps to authorize the network system 100 to directly process payments on behalf thereof. In response, the network system 100 can determine to directly process the payment for the user session 156 at the entity identified by entity identifier 149. For other entities, the network system can determine to transmit the payment information 138 to enable the third-party financial processor 160 to process payments.

Methodology

Figure 2:
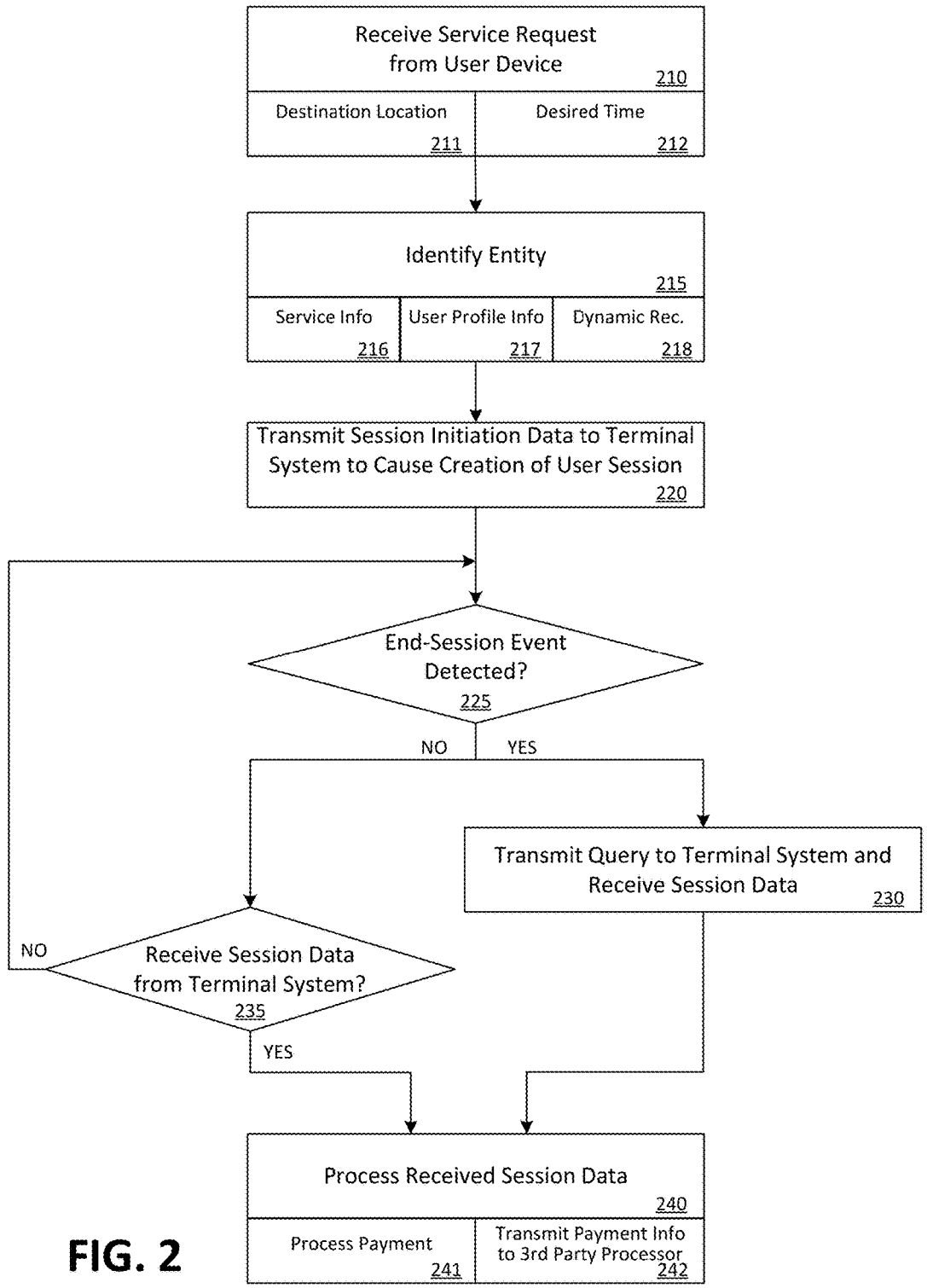
FIG. 2 is a flow chart describing an example method of operating an example network system, according to examples described herein.

FIG. 2 is a flow chart describing an example method of operating an example network system, according to examples described herein. In the below discussion of FIG. 2, reference may be made to features and examples shown and described with respect to FIG. 1. For instance, the example method shown in FIG. 2 can be performed by the network system 100 shown in and discussed in FIG. 1.

Referring to FIG. 2, the network system receives a service request from a user device operated by a requesting user (210). The service request can include an identification of a destination location (e.g., a location at which the service provider would drop-off the requesting user) (211) and a desired time (212). The desired time can refer to a time the service provider is to rendezvous with the requesting user or a time the service provider is to drop-off the requesting user at the destination location.

At step 215, the network system can identify an entity for the particular service request from the user. The entity can be identified based on information related to the service request (216). In one aspect, the network system can identify the entity based on the destination location, which can be entered as an address or as an entity name. The network system can query a database for the particular address or entity named entered to identify the entity. The network system can also query the database for entities nearby to the destination location if, for example, the destination location is entered as a cross street or as a point or selection on an interactive map displayed on the user device. The query performed by the network system can include a determination as to whether the entity supports the seamless session process facilitated by the network system. For example, the database storing entity information (e.g., database 145 of FIG. 1) can store information for each entity relating to whether the terminal system at the entity supports integrations with the network system to provide the seamless session process described herein. To identify an entity, the network system can further take into account information related to the requested service such as estimated time of arrival at the destination location, etc.

In some instances, such as when the user enters the destination location as a point on the interactive map, the network system may initially identify a plurality of nearby entities. In these and other instances, the network system can determine the entity from the plurality of nearby entities based on user profile information (217). The user profile information can indicate the user's specified preferences for certain specific entities or certain types or categories of entities, data indicating past user activity such as past requests for the on-demand service and/or data pertaining to past sessions. The network system can identify the entity based on the user profile information or remove from consideration entities that do not match the user profile information. In addition, the network system can include a recommendation engine to generate dynamic recommendations regarding one or more entities that may be of interest to the user near the destination location (218). The network system can also transmit content data to enable the user device to display a list of nearby entities supporting the seamless session process identified based on the service information, user profile information, and dynamic recommendations. In response, the user can select the entity from the list to begin the seamless session process.

According to embodiments, the network system can transmit session initiation data to a terminal system at the identified entity to cause the terminal system to automatically create a user session for the user (220). The session initiation data can include user data such as identification information such as the name or a nickname of the user, a photograph of the user, a unique graphical avatar, or other means of identifying the user. The user session can be used to store records of items or services provided by the entity that are procured by the user. In some implementations, the network system need not transmit payment or financial information of the user (e.g., credit card information, bank account information, etc.) to the terminal system because payment can be processed by the network system using a payment method stored with the user profile maintained by the network system. In this manner, the security of the user's sensitive financial information can be enhanced since such information need not be transmitted, stored, or exchanged at the terminal system.

During the user's visit to the entity, the user can procure items and/or services using the identification information included in the user data transmitted to the terminal system. Typically, the user can identify him or herself to an operator of the terminal system (e.g., a cashier, a waiter/waitress, a bartender, etc.) using the identification information (e.g., the user's name) to procure items or services. The operator can interact with the terminal system to enter information corresponding to items and/or services requested by the user to be recorded under the user's session. In addition, in some implementations the user may be able to interact with the user application (or a related application) executing on the user device to submit requests for items and/or services at the entity.

After the creation of the user session, the network system can transmit data to the user device to enable the user device to display recommendations for items and/or promotions available at the entity. In one example, during the user's visit to an entity, the user device can display promotions relating to a discounted or free service to be arranged by the network system for the user should the user's user session reflect a certain amount of purchases. The discounted or free service can be configured to be geo-fenced (e.g., only available from the entity location to the user's home location, etc.) and time-bound (e.g., only available at a specific time of a specific day, etc.). In another example, the user device can display promotions or recommendations regarding items or services available for the user at the entity.

According to embodiments, the network system can detect a number of account-end events (225). The account-end events can include a determination, based on location data received from the user device, that the user has completed his or her visit to the entity. For instance, if the location data received from the user device indicates that the user has departed the entity, the network system can determine that an account-end event has occurred. In addition, the network system can further receive another service request from the user device requesting on-demand services away from the entity. The network system can also treat the receipt of such a service request as an account-end event. In response to detecting such events, the network system can transmit a query to the terminal system to cause the terminal system to close the user session for the user and to transmit session data to the network system (230). In addition, the network system or the terminal system may determine to close the user session based on a timeout of the user's user session. For instance, if the user session has been idle (e.g., no activity) for a certain amount of time, the network system or the terminal device can cause the user session to be closed and the session data to be transmitted to the network system.

In addition to detecting an account-ending event to cause the transmission of a query to the terminal system to close the user session, the operator interface on the terminal system enables the operator of the terminal system to close the user session for the user. For instance, the operator can close the user session at the request of the user or after the entity has completed its business for the day. The closing of the user's user session by the operator causes the terminal system to transmit session data of the user to the network system (235). If no session data is received from the terminal device via the operator's closure of the user and if no end-account event is detected, the network system can be configured to wait until such events occur. Upon receipt of the session data, the network system can begin processing, or facilitate the processing of, one or more payments on behalf of the user and the entity. In certain examples, the network system can be configured to generate additional recommendations regarding other nearby entities after session data is received from the terminal system. The session data received by the network system from the terminal system can include an itemized accounting of the user's procured items and/or services at the entity.

According to embodiments, the session data can be processed in different manners depending on the implementation and/or the entity. In some examples, the network system can include a component or sub-system to process one or more payments on behalf of the user and the entity (217). The network system can process the one or more payments using payment information stored in the user's user profile maintained by the network system (e.g., user profile associated with the on-demand service). As an alternative, the network system can transmit payment data (e.g., amount to be charged, user's payment information) to a third-party payment processor to process the one or more payments on behalf of the user and the entity (242). The payment data can be encrypted before being transmitted from the network system to the third-party payment processor. Still further, the network system can dynamically determine whether to process the payment or to transmit data to a third-party financial payment processor to process the payment. Such a determination can be based on the identity of the entity. For instance, a particular entity may not have completed the necessary steps (e.g., signing contractual agreements, etc.) to allow payments to the particular entity to be processed directly by the network system. In such a scenario, the network system can determine, based on the identity of the particular entity, to transmit payment data to the third-party payment processor rather than attempting to process a payment on behalf of the entity.

User and Operator Interfaces

Figures 3A, 3B:
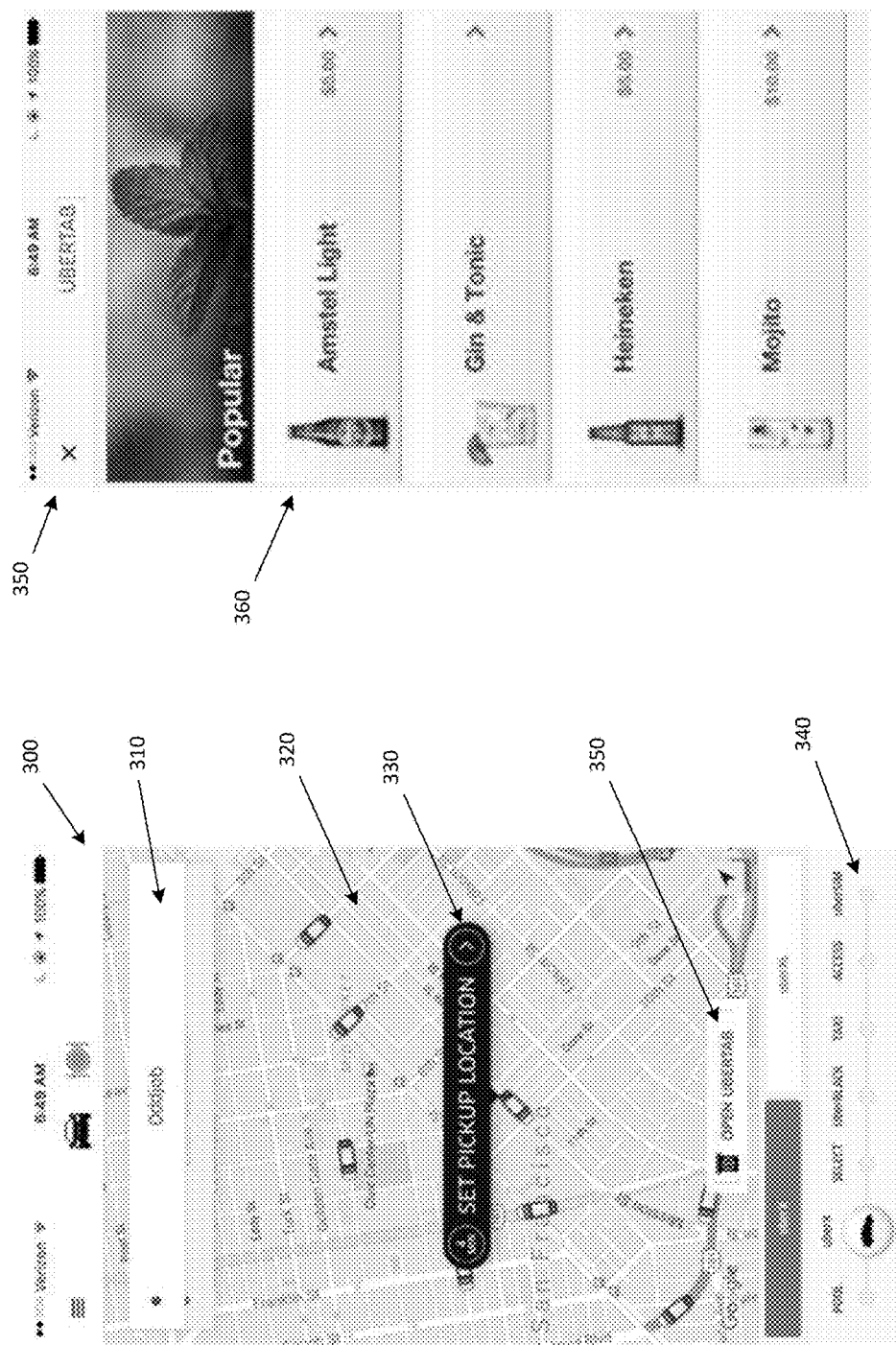
FIGS. 3A-3B illustrate example user interfaces for a user application to request a service and to request items or services at an entity, in accordance with examples described herein.

FIGS. 3A-3B illustrate example user interfaces for a user application to request a service and to request items or services at an entity, in accordance with examples described herein.

Referring to FIG. 3A, the exemplary user interface 300 can be displayed by a user device (e.g., user device 195 of FIG. 1) to enable the user to transmit and manage a service request. The user interface 300 can include input features 310 to receive textual user input regarding a start location and a destination location. In addition, the user interface 300 can include a map feature 320 to display an interactive map to allow the user to select the start and/or destination locations via the map feature 320. For instance, the user can tap feature 330 to set a start location. Additionally, the user can select a class of service (e.g., economy service, luxury service, ride-pool service) via a class of service selector 340.

The exemplary user interface 300 further includes a feature 350 to establish a user session for the user at entity nearby to the user or nearby to the user's destination location. For instance, by selecting feature 350 via a soft selection, the user can be presented with a list of nearby entities from which to select. In response to the user selection, the network system can transmit user data to the appropriate terminal system such that the terminal system can automatically create a user session for the user.

Referring to FIG. 3B, the exemplary user interface 350 can be displayed by the user device to enable the user to request items or services. The user interface 350 can display a list of recommended items for the user based on user preferences. In addition, the user interface 350 can display a list of popular items offered by the entity. The user interface 350 can be displayed on the user device once the user is traveling to the entity and/or after the user has arrived at the entity. Feature 360 can correspond to a request for a specific item offered by the entity. The feature 360 can display a visual graphic of the specific item, a name of the specific item, and a corresponding price. In response to receiving a user selection of the feature 360, the network system can transmit the request to the terminal system at the entity. In some examples, the request can be transmitted directly from the user device to the terminal device without being intermediated by the network system.

Figure 4:
FIG. 4 illustrates an example user interface displayed on a terminal system for managing sessions, in accordance with examples described herein.

FIG. 4 illustrates an example user interface displayed on a terminal system for managing sessions, in accordance with examples described herein. Example operator interface 400 can be displayed by a terminal device (e.g., terminal device 150 of FIG. 1) to allow an operator of the terminal device to manage user sessions. The operator interface 400 includes an itemized display 410 of items or services requested by the user. The operator interface 400 further includes a summary display 420 for conveying a summary (e.g., subtotal, tax, and total amount, etc.) of the user session. In addition, the operator interface 400 includes a feature 430 to enable the operator to open a user session for a user and a feature 440 to enable the operator to close an existing user session.

Hardware Diagrams

Figure 5:
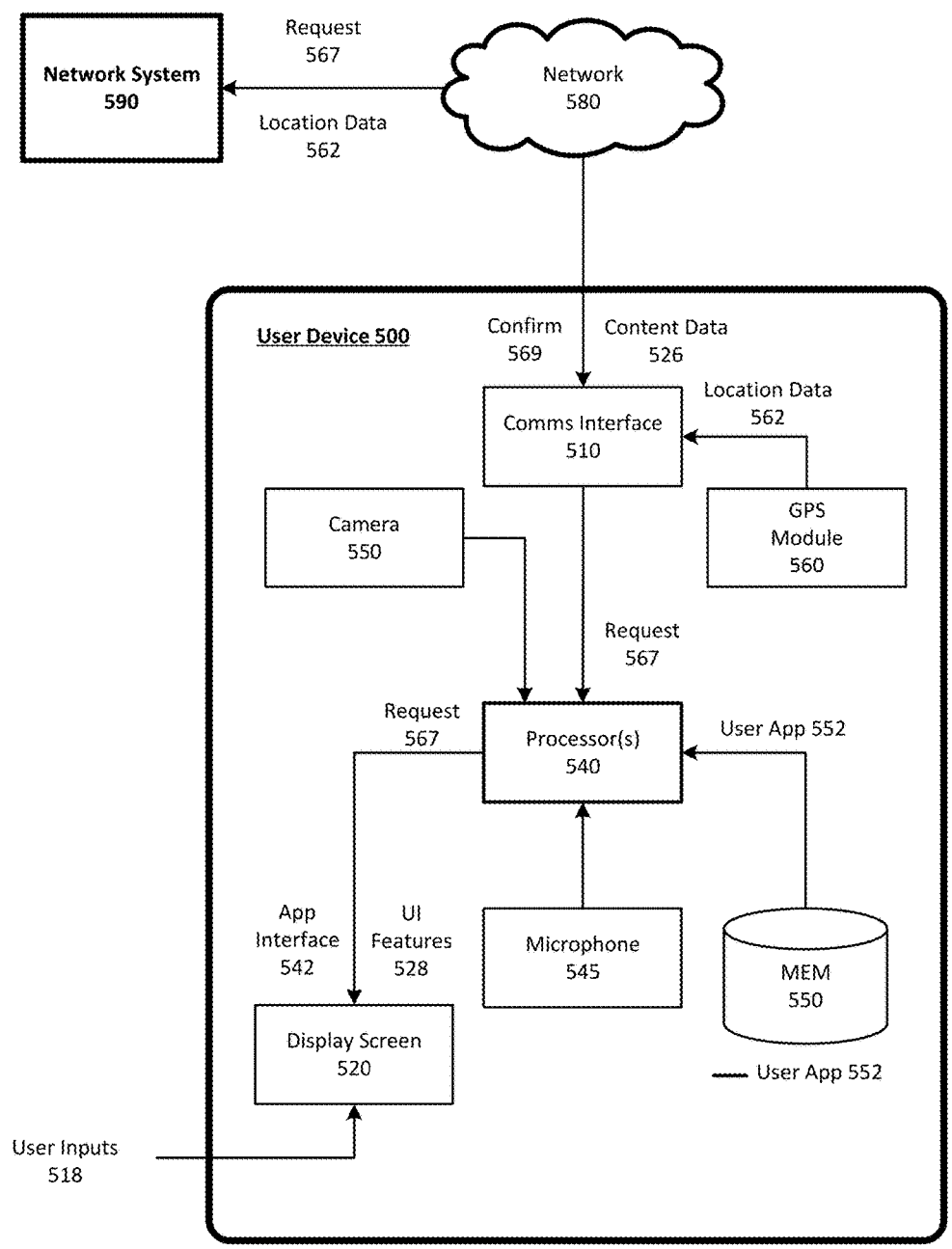
FIG. 5 is a block diagram illustrating an example user device executing a designated user application for a network service, as described herein.

FIG. 5 is a block diagram illustrating an example user device executing a designated user application for a network service, as described herein. In many implementations, the user device 500 can comprise a mobile computing device, such as a smartphone, tablet computer, laptop computer, VR or AR headset device, and the like. As such, the user device 500 can include typical telephony features such as a microphone 545, a camera 550, and a communication interface 510 to communicate with external entities using any number of wireless communication protocols. In certain aspects, the user device 500 can store a designated application (e.g., a user app 532) in a local memory 530. In many aspects, the user device 500 further store information corresponding to a contacts list 534, and calendar appointments 536 in the local memory 530. In variations, the memory 530 can store additional applications executable by one or more processors 540 of the user device 500, enabling access and interaction with one or more host servers over one or more networks 580.

In response to a user input 518, the user app 532 can be executed by a processor 540, which can cause an app interface 542 to be generated on a display screen 520 of the user device 500. The app interface 542 can enable the user to, for example, check current price levels and availability for the on-demand service. In various implementations, the app interface 542 can further enable the user to select from multiple ride service types, such as a carpooling service type, a regular ride-sharing service type, a professional ride service type, a van service type, a luxurious ride service type, and the like.

The user can generate a service request 567 via user inputs 518 provided on the app interface 542. For example, the user can select or input a start location, select or input a destination location, view the various available service types and their respective estimated pricing, and select a particular service. In many examples, the user can input the destination prior to rendezvousing with the service provider. As provided herein, the user application 532 can further enable a communication link with a network system 590 over the network 580, such as the network system 100 as shown and described with respect to FIG. 1. The processor 540 can generate user interface features 528 (e.g., map, trip progress bar, content cards, etc.) using content data 526 received from the network system 590 over network 580. Furthermore, as discussed herein, the user application 532 can enable the network system 590 to cause the generated user interface 528 to be displayed on the application interface 542.

The processor 540 can transmit the service requests 567 via a communications interface 510 to the backend network system 590 over a network 580. In response, the user device 500 can receive a confirmation 569 from the network system 590 indicating the selected service provider and vehicle that will service the service request 567 and rendezvous with the user at the start location. In various examples, the user device 500 can further include a GPS module 560, which can provide location data 562 indicating the current location of the requesting user to the network system 590 to, for example, establish the start location and/or select an optimal service provider or autonomous vehicle to service the service request 567.

Figure 6:
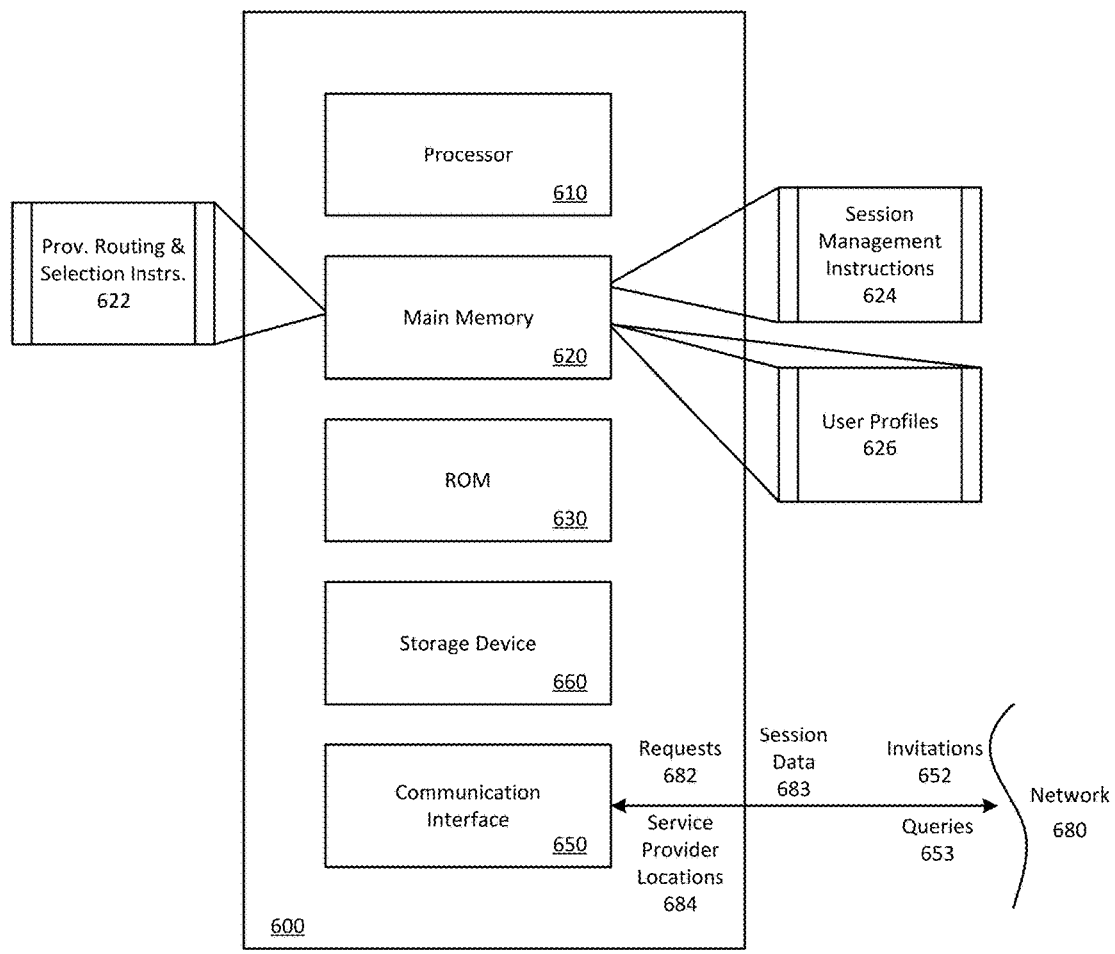
FIG. 6 is a block diagram illustrating a computer system upon which examples described herein may be implemented.

FIG. 6 is a block diagram illustrating a computer system upon which examples described herein may be implemented. A computer system 600 can be implemented on, for example, a server or combination of servers. For example, the computer system 600 may be implemented as part of a service for providing on-demand services. In the context of FIG. 1, the network system 100 may be implemented using a computer system 600 such as described by FIG. 6. The network system 100 may also be implemented using a combination of multiple computer systems as described in connection with FIG. 6.

In one implementation, the computer system 600 includes processing resources 610, a main memory 620, a read-only memory (ROM) 630, a storage device 640, and a communication interface 650. The computer system 600 includes at least one processor 610 for processing information stored in the main memory 620, such as provided by a random access memory (RAM) or other dynamic storage device, for storing information and instructions which are executable by the processor 610. The main memory 620 also may be used for storing temporary variables or other intermediate information during execution of instructions to be executed by the processor 610. The computer system 600 may also include the ROM 630 or other static storage device for storing static information and instructions for the processor 610. A storage device 640, such as a magnetic disk or optical disk, is provided for storing information and instructions.

The communication interface 650 enables the computer system 600 to communicate with one or more networks 680 (e.g., cellular network) through use of the network link (wireless or wired). Using the network link, the computer system 600 can communicate with one or more computing devices, one or more servers, and/or one or more self-driving vehicles. In accordance with examples, the computer system 600 receives service requests 682 from mobile computing devices of individual users. The executable instructions stored in the memory 630 can include selection instructions 622, which the processor 610 executes to select an optimal drive to service the service request 682. In doing so, the computer system can receive service provider locations 684 of service providers operating throughout the given region, and the processor can execute the selection instructions 622 to select an optimal service provider from a set of available service providers, and transmit a service invitation 652 to enable the service provider to accept or decline the ride service offer.

The executable instructions stored in the memory 620 can also include session management instructions 624, which enable the computer system 600 to initiate, manage, terminate, and/or process the user sessions described herein. For instance, the session management instructions 624 can cause the computer system 600 to transmit session initiation data to one or more terminal systems at an entity to initiate or open a user session. The session management instructions 624 can further cause the computer system 600 to transmit queries 653 to cause the one or more terminal systems to terminate or close the user session and transmit session data 683 to the computer system 600. The session management instructions 624 can further cause the computer system 600 to process received session data 683.

By way of example, the instructions and data stored in the memory 620 can be executed by the processor 610 to implement an example network system 100 of FIG. 1. In performing the operations, the processor 610 can receive service requests 682 and service provider locations 684, and submit service invitations 652 to facilitate the servicing of the requests 682.

The processor 610 is configured with software and/or other logic to perform one or more processes, steps and other functions described with implementations, such as described by FIGS. 1-4, and elsewhere in the present application.

Examples described herein are related to the use of the computer system 600 for implementing the techniques described herein. According to one example, those techniques are performed by the computer system 600 in response to the processor 610 executing one or more sequences of one or more instructions contained in the main memory 620. Such instructions may be read into the main memory 620 from another machine-readable medium, such as the storage device 640. Execution of the sequences of instructions contained in the main memory 620 causes the processor 610 to perform the process steps described herein. In alternative implementations, hard-wired circuitry may be used in place of or in combination with software instructions to implement examples described herein. Thus, the examples described are not limited to any specific combination of hardware circuitry and software.

It is contemplated for examples described herein to extend to individual elements and concepts described herein, independently of other concepts, ideas or systems, as well as for examples to include combinations of elements recited anywhere in this application. Although examples are described in detail herein with reference to the accompanying drawings, it is to be understood that the concepts are not limited to those precise examples. As such, many modifications and variations will be apparent to practitioners skilled in this art. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude claiming rights to such combinations.

What is claimed is:

1. A network system, comprising:
   one or more hardware processors; and
   one or more memory resources storing instructions that, when executed by the one or more hardware processors, cause the network system to:
   receive, by the network system from a user computing device of a user, data corresponding to a service request for a transport service to a destination location;
   in response to receiving the data corresponding to the service request,
   (i) identify a service provider to fulfill the service request, and (ii) identify, from a database accessible by the network system, an entity identifier based, at least in part, on the destination location;
   cause a terminal computing system located at an entity that is identified by the entity identifier to automatically create a session for recording one or more transactions of the user by transmitting a set of data including identification information for the user to the terminal computing system; and
   receive, by the network system from the terminal computing system upon termination of the session for the user, session data associated with the session that indicates one or more transactions of the user during the session.

2. The network system of claim 1, wherein the executed instructions further cause the network system to transmit content data to the user computing device to cause the user computing device to display a selectable list of entities as part of a graphical user interface, the selectable list of entities being determined based on the destination location.

3. The network system of claim 1, wherein the destination location is specified by the user, through user input on a graphical user interface of the user computing device, as an address, a location name, or an entity name.

4. The network system of claim 1, wherein the executed instructions further cause the network system to identify the entity identifier based further on user profile data associated with the user that indicates: (i) a preference of the user, (ii) historical session information of the user, or (iii) historical requests of the user.

5. The network system of claim 1, wherein the identification information includes at least one of a user identifier, a name, or a photograph of the user.

6. The network system of claim 1, wherein the executed instructions further cause the network system to:
   receive, from the user computing device, through user input on a graphical user interface of the user computing device, a set of selection data indicating a selection of one or more items or services; and
   in response to receiving the set of selection data, transmit at least a portion of the set of selection data to the terminal computing system.

7. The network system of claim 6, wherein the set of selection data is received from the user computing device by the network system while the user is traveling to the destination location.

8. The network system of claim 1, wherein the executed instructions further cause the network system to:
   determine a current location of the user;
   determine that the user is traveling to the destination location; and
   transmit content data to the user computing device to cause the user computing device to display one or more items or services associated with the entity identifier while the user is traveling to the destination location.

9. The network system of claim 1, wherein the executed instructions further cause the network system to transmit, to the terminal computing system, a query for the session data (i) in response to a termination signal received from the user computing device, (ii) in response to data corresponding to a second service request received from the user computing device, or (iii) based on a current location of the user.

10. The network system of claim 9, wherein the query causes the terminal computing system to terminate the session for the user.

11. The network system of claim 1, wherein the executed instructions further cause the network system to:
    transmit, to a provider device of the identified service provider, an invitation to fulfill the service request for the user.

12. A computer-implemented method comprising:
    receiving, by a network system from a user computing device of a user, data corresponding to a service request for a transport service to a destination location;
    in response to receiving the data corresponding to the service request, (i) identifying a service provider to fulfill the service request, and (ii) identifying, from a database accessible by the network system, an entity identifier based, at least in part, on the destination location;
    causing a terminal computing system located at an entity that is identified by the entity identifier to automatically create a session for recording one or more transactions of the user by transmitting a set of data including identification information for the user to the terminal computing system; and receiving, by the network system from the terminal computing system upon termination of the session for the user, session data associated with the session that indicates one or more transactions of the user during the session.

13. The method of claim 12, further comprising transmitting content data to the user computing device to cause the user computing device to display a selectable list of entities as part of a graphical user interface, the selectable list of entities being determined based on the destination location.

14. The method of claim 12, wherein the destination location is specified by the user, through user input on a graphical user interface of the user computing device, as an address, a location name, or an entity name.

15. The method of claim 12, further comprising identifying the entity identifier based further on user profile data associated with the user that indicates:
(i) a preference of the user, (ii) historical session information of the user, or (iii) historical requests of the user.

16. The method of claim 12, further comprising:
receiving, from the user computing device, through user input on a graphical user interface of the user computing device, a set of selection data indicating a selection of one or more items or services; and
in response to receiving the set of selection data, transmitting at least a portion of the set of selection data to the terminal computing system.

17. The method of claim 16, wherein the set of selection data is received while the user is traveling to the destination location.

18. The method of claim 12, further comprising transmitting, to the terminal computing system, a query for the session data (i) in response to a termination signal received from the user computing device, (ii) in response to data corresponding to a second service request received from the user computing device, or (iii) based on a current location of the user.

19. The method of claim 18, wherein the query causes the terminal computing system to terminate the session for the user.

20. A non-transitory computer-readable medium storing instructions that, when executed by one or more hardware processors of a network system, cause the network system to:
receive, by the network system from a user computing device of a user, data corresponding to a service request for a transport service to a destination location;
in response to receiving the data corresponding to the service request, (i) identify a service provider to fulfill the service request, and (ii) identify, from a database accessible by the network system, an entity identifier based, at least in part, on the destination location;
cause a terminal computing system located at an entity that is identified by the entity identifier to automatically create a session for recording one or more transactions of the user by transmitting a set of data including identification information for the user to the terminal computing system; and
receive, by the network system from the terminal computing system upon termination of the session for the user, session data associated with the session that indicates one or more transactions of the user during the session.

* * * * *